Nov. 11, 1958 W. E. KATZ ET AL 2,860,095
SEPARATION OF ELECTROLYTIC SOLUTIONS INTO
CONCENTRATED AND DILUTE STREAMS
Filed July 22, 1952 3 Sheets-Sheet 1

INVENTORS
WILLIAM E. KATZ
NORMAN W. ROSENBERG
BY
ATTORNEYS

Nov. 11, 1958

W. E. KATZ ET AL 2,860,095

SEPARATION OF ELECTROLYTIC SOLUTIONS INTO
CONCENTRATED AND DILUTE STREAMS

Filed July 22, 1952

*INVENTORS*
WILLIAM E. KATZ
NORMAN W. ROSENBERG
BY

ATTORNEYS

Fig. 8

INVENTORS
WILLIAM E. KATZ
NORMAN W. ROSENBERG

ATTORNEYS

2,860,095

SEPARATION OF ELECTROLYTIC SOLUTIONS INTO CONCENTRATED AND DILUTE STREAMS

William E. Katz, Cambridge, and Norman W. Rosenberg, Newton, Mass., assignors to Ionics, Incorporated, Cambridge, Mass., a corporation of Massachusetts Application July 22, 1952, Serial No. 300,302

19 Claims. (Cl. 204—180)

The present invention relates to processes employing electrical energy to effect the migration of ions from one solution to another across ion-permeable barriers separating the solutions, and consists in method and apparatus for continuously separating a solution containing dissolved salts into dilute and concentrated streams by such processes.

The invention utilizes one or more concentrating and diluting cells, each having a set of diluting chambers (for one stream) alternately disposed between a set of concentrating chambers (for the other stream) and separated therefrom by membranes through which anions and cations of dissolved salts are transferred from diluting chambers to concentrating chambers. Objects of this invention are to improve the operating efficiency of concentrating and diluting cells, to provide a system extending the degree of concentration and dilution attainable in the cells, and to provide a system wherein the concentrations of the two solutions may be controlled for optimum utilization of the electrical energy.

The system provided by this invention is particularly useful for the removal of salt or other electrolytes from sea water or other supplies of water undesirably high in dissolved salt content, and for the recovery of mineral values from such waters, especially where a single source of water is to be divided into concentrated and dilute fractions.

According to the invention a first stream of solution to be treated is passed through one set of chambers (concentrating or diluting) and a fraction of the effluent therefrom is passed through the other set of chambers. In this manner the difference in the concentrations of the solutions in the respective chambers is maintained desirably low thereby greatly improving the operation of the cell units. In preferred embodiments a stream to be either diluted or concentrated is passed in series through like sets of chambers of several cell units, and after at least partial treatment, a fraction of the treated stream is passed through the other set of chambers of one or more of the cell units. Most preferably, the several units are connected with both the concentrating sets and diluting sets of chambers in hydraulic series and one stream after passage through one series of like sets of chambers is divided into a product stream (which may be further treated) and a second stream which is fed through the other sets of chambers in the order of flow opposite that of the first stream.

This invention will be more fully understood from the following detailed description of representative embodiments selected for purposes of illustration and from the drawings in which.

Figure 1:
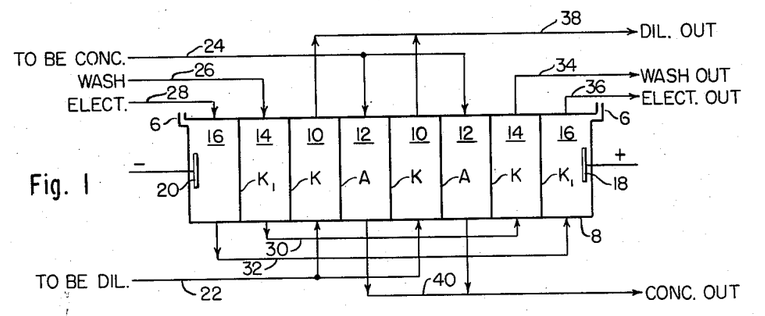
Fig. 1 shows schematically a concentrating and diluting cell unit in cross-section.

A concentrating and diluting cell unit is shown schematically in Fig. 1. In general the cell consists of a container 8 divided into parallel alternating diluting chambers 10 and concentrating chambers 12 by alternating cation permeable membranes K and anion permeable membranes A. Electrodes 18 and 20 are provided at the ends of the container 8, and between each electrode and the ends of the battery of diluting and concentrating chambers 10 and 12 is situated an additional membrane $K_1$ (preferably cation permeable), defining electrode chambers 16 and washing chambers 14. A vent 6 in each electrode chamber 16 allows gases generated by electrolysis to escape from the cell. The washing chambers 14 and electrode chambers 16 do not function directly in the concentrating and diluting process, but are provided to minimize contamination of the solutions in the concentrating and diluting chambers by the products of electrolysis.

The diluting chambers 10 and concentrating chambers 12 are separately fed in parallel through conduits 22 and 24 respectively, and the solutions are removed through conduits 38 and 40 respectively. The washing chambers 14 and electrode chambers 16 are each separately connected in series by influent conduits 26 and 28 respectively, connecting conduits 30 and 32 respectively, and effluent conduits 34 and 36 respectively.

In operation, separate streams of a salt solution to be diluted and concentrated are passed through the diluting chambers 10 through conduits 22 and 38 and through concentrating chambers 12, through conduits 24 and 40 respectively. A washing stream of the same solution is passed through the washing chambers 14, through conduits 26, 30 and 34, and an electrolytically conductive solution is passed through the electrode chambers 16 through conduits 28, 32 and 36. An electric current is then passed through the cell so that the electrode 18 on the anion permeable membrane side of the diluting chambers 10 is the anode, thus to cause cations to cross the cation permeable barriers K in migration toward the cathode, and anions to cross the anion permeable membranes A in migration toward the anode. Thereby, each diluting chamber 10 becomes depleted in its electrolyte content, while the alternating concentrating chambers 12 receive this electrolyte. Current is conducted to the battery of concentrating and diluting chambers 12 and 10 through the solutions in the electrode chambers 16 and the solutions in the washing chambers 14, with negligible contamination of the solutions being treated by products of electrolysis formed at the electrodes. The washing chambers 14 not only separate the terminal concentrating and diluting chambers 12 and 10 from the electrode chambers 16, but they also receive cations from the terminal diluting chamber 10 while supplying cations to the terminal concentrating chamber 12. It is for this reason desirable that the same solution as that being treated is circulated through the washing chambers 14.

In the operation of cells of the type just described to transfer electrolyte from a dilute solution to a concentrated solution, there is established a condition tending to counteract the concentration change effected by the passage of electric current through the cell. Dissolved electrolyte diffuses through the membrane from the concentrated solution to the dilute solution while water diffuses from the dilute solution to the concentrated solution, both at rates proportional to the concentration difference. Thus, as the concentration difference maintained across the membranes is increased, the power required to move ions from the dilute solution to the concentrated solution increases considerably and for high degrees of dilution, it is necessary to pass the solution through a plurality of cell units so that, as the concentration of electrolyte in the diluting solution is decreased, the concentration of the concentrating solution may be maintained at a lower value than it could in a single cell unit. Similarly, for high degrees of concentration a plurality of cell units are provided so that the concentration of the diluting solution may be maintained at a higher value than is possible in a single cell unit. Where there is but a single source of water which itself must be utilized for both dilution and concentration, this water is both the most dilute solution externally available for the concentrating cells, and the most concentrated solution externally available for the diluting cells.

The present invention provides a concentrating and diluting system for the efficient separation to any desired degree of an electrolytic solution into a concentrated stream and a diluted stream, wherein either the concentrating stream in any cell unit is of concentration lower than that externally available or the diluting stream is of concentration greater than that externally available so that ions in the electrolyte from the diluting stream may be more efficiently transferred to the concentrating stream. In accordance with one embodiment of the invention, the concentrating stream for one or several of the cell units is divided from the diluting stream after dilution thereof, thus providing a concentrating stream of lower concentration to which salt may be more readily transferred. Preferably, in multi-unit operation, a concentrating stream is divided from diluted diluting stream and passed through the several units in the order opposite that of the flow of the diluting stream to a unit preceding the point of division from which the concentrating stream effluent is of a concentration higher than that of the source of solution to be separated.

Figure 2:
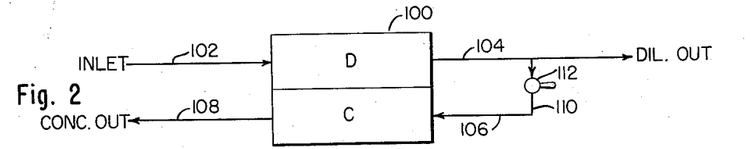
Fig. 2 shows schematically a system of the invention embodying a single concentrating and diluting cell unit.

A system of the present invention embodying a single concentrating and diluting cell unit is shown in Fig. 2. The unit 100 containing diluting chambers schematically represented as D (which correspond to the chambers 10 shown in Fig. 1) and concentrating chambers schematically represented as C (which correspond to the chambers 12 of Fig. 1) is provided with influent connections 102 and 106 to the diluting and concentrating chambers respectively and effluent conduits 104 and 108 from the diluting and concentrating chambers respectively. Conduit 110 connects to the effluent conduit 104 from the diluting chambers through a valve 112, and leads to the influent conduit 106 to the concentrating chambers. The appropriate electrical connections to the cell are made through means shown in Fig. 1.

In operation, the solution to be separated is introduced through conduit 102 to the diluting chambers and a fraction of the effluent therefrom (controlled by the valve 112) is withdrawn from the effluent conduit 104 and passed through the connecting conduit 110 to the influent connection 106 to the concentrating chambers. The concentrated fraction is then withdrawn from the concentrating chambers through the effluent connection 108. When the desired flow conditions have been established, electrical energy to effect separation is supplied as direct current. The solution being treated when steady state conditions have been reached, is first diluted in the diluting chambers D and a fraction of the diluted solution is then supplied as concentrating solution to the concentrating chambers C. Supplying the concentrating chambers with a solution more dilute than the source to be separated, greatly enhances the efficiency of separation and the degree of separation attainable in the unit. Data from the operation of a cell unit in accordance with this invention compared with data from the operation of a cell unit in which separate streams from the source to be diluted and concentrated are provided for the two sets of chambers are given in Table I. The cell unit contained 35 chamber pairs each having a volume of 15 cu. cm. and an exposed membrane area of 100 sq. cm. The flow of the concentrating and diluting solutions on opposite sides of the membranes was in mutually countercurrent directions.

Table I

|  | Conc. stream divided from dil. stream | Conc. stream from source |
|---|---|---|
| Current, amperes | 1.29 | 1.26 |
| Power, watts | 18.0 | 16.2 |
| Flow rates—cc./sec.: |  |  |
| Influent diluting | .691 | .654 |
| Effluent diluting (dil. prod.) | .500 | .500 |
| Influent concentrating | .069 | .200 |
| Effluent concentrating | .191 | .354 |
| Concentrations, m. eq./cc.: |  |  |
| Influent diluting | .63 | .63 |
| Effluent diluting | .13 | .13 |
| Influent concentrating | .13 | .63 |
| Effluent concentrating | 1.94 | 1.34 |
| Current Efficiency [1] | 0.82 | 0.77 |

[1] By current efficiency it is meant the number of equivalents of salt that is transferred, per chamber in each cell, for each equivalent of current (96,000 amperes-seconds) passed through the chamber.

Figure 3:
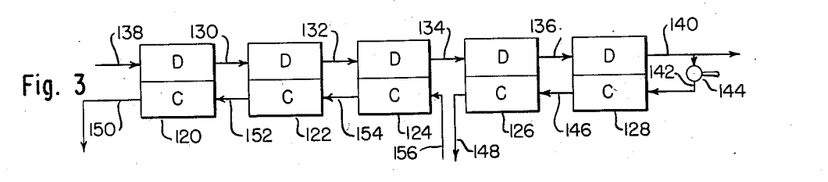
Fig. 3 shows schematically a system of the invention embodying several concentrating and diluting cell units.

A system constructed in accordance with the present invention and designed to permit higher degrees of dilution than are attainable in a single cell unit (such as those necessary to render sea water potable) is shown in Fig. 3. The system consists of five concentrating and diluting units 120, 122, 124, 126 and 128, having their diluting chambers D connected in hydraulic series by conduits 130, 132, 134 and 136, each connecting the effluent of one unit to the influent of the next unit. An influent connection to the first unit is provided by conduit 138 and an effluent connection from the last unit is provided by conduit 140. A concentrating solution for the last two stages is divided from the effluent dilute solution from the last stage. A conduit 142 connects into the effluent conduit 140 from the diluting chamber of the last stage 128 through a valve 144 and connects with the influent side of the concentrating chamber of the last stage 128. The concentrating solution is then directed in series back through the next to last stage 126 through the conduit 146, and the effluent concentrating solution from that stage is discharged to waste through the effluent conduit 148. The concentrating chambers of the first three stages 120, 122 and 124 are connected in series by conduits 152 and 154, the first stage 120 being provided with a separate effluent conduit 150 and the third stage being provided with an influent conduit 156, the former of these also leading to waste. Appropriate electrical connections to the electrodes of each unit (not shown) are provided separately for the various units.

The operation of this system to separate a 0.6 normal sodium chloride solution (a concentration of dissolved ionized substances similar to that found in sea water) to concentrated and diluted streams will now be described. In the unit tested, each concentrating and diluting chamber had a volume of 17 cm.$^3$ and each membrane had an available area for the transfer of ions of 140 sq. cm. The number of chamber pairs in each stage were as follows:

| Stage | Reference No. | No. of Concentrating and Diluting Chambers |
|---|---|---|
| 1 | 120 | 25 |
| 2 | 122 | 25 |
| 3 | 124 | 25 |
| 4 | 126 | 25 |
| 5 | 128 | 25 |

A 0.6 normal sodium chloride solution was passed through the diluting chambers of the five stages in series, and a fraction of the effluent from the last stage, adjusted by the proportioning valve 144, was circulated in the opposite order of flow through the concentrating chambers of the last two stages. The concentrating chambers of the first three stages were supplied in series with a 0.6 normal sodium chloride solution introduced into the concentrating chamber of the third stage. A direct current was supplied to each stage by means shown in Fig. 1. The operating data are given in Table II.

For purposes of comparison, Table II also reports data from the operation of the same five stages of concentrating and diluting units under nearly identical conditions but with the original 0.6 normal solution as the only source of a concentrating stream. This system is shown schematically in Fig. 4. The diluting chambers of the five stages 120, 122, 124, 126 and 128 are connected in hydraulic series by the conduits 130, 132, 134 and 136 in the manner described with reference to Fig. 3 and an influent conduit 138 and an effluent conduit 140 for the first and last stages are similarly provided. The concentrating chambers are also connected in hydraulic series by the conduits 162, 164, 166 and 168, each connecting the effluent side of the concentrating chambers of one unit to the influent side of the concentrating chambers of the next unit. An influent conduit 160 connects into the concentrating chambers of the last stage and an effluent conduit 170 connects to the concentrating chambers of the first stage, thereby providing for flow of concentrating solution in the order opposite that of the flow of diluting solution, so that the least concentrated concentrating solution is associated with the most dilute diluting solution.

Figure 4:
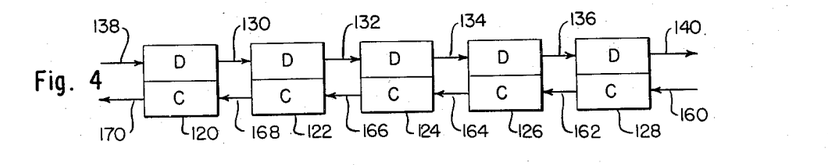
Fig. 4 shows schematically for comparison a system embodying several concentrating and diluting cell units connected in series whereby each stream is flowed exclusively through a series of like chambers.

In the operation of this system, a 0.6 normal sodium chloride solution was flowed through the diluting chambers in series entering through conduit 138 and discharging through conduit 140, and a 0.6 normal sodium chloride solution was flowed in series in the opposite order of flow through the concentrating chambers entering through conduit 160 and discharging through the conduit 170. It will be seen from Table II that by using a fraction of the diluted stream, as part of the concentrating stream, there results a considerable saving of electrical energy in terms of both the amount of water treated and the amount of salt transferred. Moreover, it will be seen that the system of the present invention yields a diluted stream having one-fifth the salt content of the diluted stream from a system which employs the original solution to be treated as the concentrating stream.

*Table II*

| Mode of Operation | Conc. stream divided from dilute stream (Fig. 3) | Conc. stream of 0.6 N NaCl (Fig. 4) |
|---|---|---|
| Voltage, each stage___________v__ | 15 | 15 |
| Total Current_________________a__ | 9.9 | 11.1 |
| Cell pairs per stage__________ | 25 | 25 |
| Available area per cell, pair___cm.$^2$__ | 140 | 140 |
| Power input__________________watts__ | 149 | 167 |
| Product Rate_________________G. P. H.__ | 1.9 | 2.2 |
| Kw.-h./1,000 gals.____________ | 78 | 76 |
| Kw.-h./Ton salt transferred___ | 560 | 630 |
| Current Stage 1______________a__ | 3.5 | 3.5 |
| Current Stage 2______________a__ | 2.7 | 2.7 |
| Current Stage 3______________a__ | 2.2 | 2.2 |
| Current Stage 4______________a__ | 1.1 | 1.4 |
| Current Stage 5______________a__ | 0.4 | 1.3 |
| Current Efficiency,[1] Percent: | | |
| Stage 1 | 62 | 62 |
| Stage 2 | 75 | 75 |
| Stage 3 | 72 | 70 |
| Stage 4 | 80 | 23 |
| Stage 5 | 85 | 17 |

| Mode of Operation | Conc. stream divided from product | Conc. stream of 0.6 N NaCl |
|---|---|---|
| Flow rates, ml./sec. (concentration, m. eq./cc.): | | |
| conc. stream— | | |
| influent to Stage 5 | 0.4 (0.02) | 1.8 (0.60) |
| influent to Stage 4 | 0.4 (0.25) | 1.9 (0.60) |
| effluent from Stage 4 | 0.5 (0.64) | 2.0 (0.64) |
| influent to Stage 3 | 1.8 (0.60) | 2.0 (0.64) |
| influent to Stage 2 | 1.9 (0.77) | 2.1 (0.80) |
| influent to Stage 1 | 2.1 (0.93) | 2.3 (0.95) |
| effluent from Stage 1 | 2.4 (1.04) | 2.6 (1.05) |
| dil. stream— | | |
| influent to Stage 1 | 3.0 (0.60) | 3.0 (0.60) |
| influent to Stage 2 | 2.7 (0.46) | 2.7 (0.46) |
| influent to Stage 3 | 2.5 (0.30) | 2.5 (0.30) |
| influent to Stage 4 | 2.4 (0.15) | 2.4 (0.15) |
| influent to Stage 5 | 2.3 (0.06) | 2.3 (0.12) |
| effluent from Stage 5 | 2.3 (0.02) | 2.2 (0.10) |
| feed concentration/product concentration | 30 | 6 |
| Kw.-h./Ton salt transferred: | | |
| Stage 1 | 420 | 420 |
| Stage 2 | 345 | 345 |
| Stage 3 | 365 | 365 |
| Stage 4 | 325 | 1,070 |
| Stage 5 | 282 | 1,540 |

[1] By current efficiency it is meant the number of equivalents of salt that is transferred, per chamber in each cell, for each equivalent of current (96,000 amperes-seconds) passed through the chamber.

Where it is desired to enhance the degree of concentration of the concentrated stream instead of or as well as decrease the concentration of the diluting stream, an embodiment of the present invention features the use of a fraction of the concentrated product from the concentration chambers of a concentrating and diluting unit as the stream to be diluted in one or more of the diluting chambers. As in the case of dilution, where it has been found desirable to maintain a low concentration in the concentrating chambers, it has also been found desirable where a high degree of concentration is desired, to maintain the concentration in the diluting chambers at a high value, to facilitate the transfer of salt.

Figure 5:
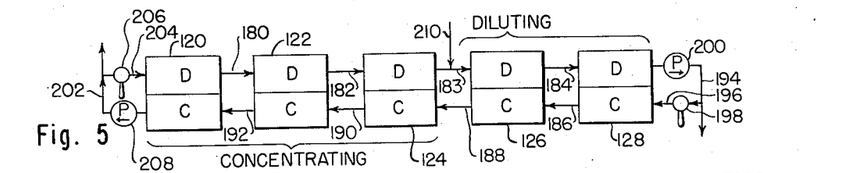
Fig. 5 shows schematically a system of the invention embodying several concentrating and diluting cell units arranged for combined concentration and dilution.

An embodiment providing for both enhanced concentration and enhanced dilution is shown schematically in Fig. 5. In general, the system consists of a diluting section (designated "Diluting") and a concentrating section (designated "Concentrating"), connected together hydraulically. Each section contains a number of concentrating and diluting units having their respective concentrating chambers and diluting chambers connected in hydraulic series. In the diluting section, the stream to be diluted is flowed in series through the diluting chambers of the units and a fraction of the diluted stream is flowed in series in the opposite order through the concentrating chambers of the units. Similarly, the units in the concentrating section are connected for series flow of the stream to be concentrated through the concentrating chambers of the units and for series flow in the opposite order of a fraction of the concentrated stream through the diluting chambers of the units. The sections are connected together for flow of the diluting stream in the concentrating section into the diluting chambers in the diluting section and for flow of the concentrating stream in the diluting section into the concentrating chambers in the concentrating section. In this manner the two sections may operate as a single system comprising a plurality of concentrating and diluting units having their corresponding chambers connected in series for flow through the concentrating chambers and diluting chambers in mutually opposite orders. Fractions of products are withdrawn from the terminal units and feed is introduced into a mid region of the series.

In the illustrated embodiment, shown in Fig. 5, the five units 120, 122, 124, 126 and 128 (described above) are connected with their diluting chambers in hydraulic series by conduits 180, 182, 183 and 184. The concentrating chambers are similarly interconnected for series flow in the opposite order by conduits 186, 188, 190 and 192. Diluted product from the last diluting chamber of the terminal unit 128 is discharged through conduit 194 into which is connected a conduit 196 through a valve 198 by means of which a stream to the concentrating chambers is supplied. A pump 200 in conduit 194 is provided to assure the proper flow conditions. Similarly, a conduit 202 discharges concentrated product from the concentrating chamber of the other terminal unit 120, while a fraction is withdrawn from conduit 202 through conduit 204, and a valve 206, and supplied to the diluting chambers of unit 120. A pump 208 is also provided in conduit 202 to maintain proper flow conditions. A feed conduit 210 connects into conduit 183 connecting the diluting chambers of units 124 and 126.

In the operation of this system, the feed solution is introduced into the feed conduit 210 while the pumps 200 and 208 are driven to force the solution to the right in the diluting chambers and to the left in the concentrating chambers in the illustrated system. The proportioning valves 206 and 198 are adjusted for the desired flow conditions and electrical energy is then supplied to the several concentrating and diluting units. The feed solution supplied through conduit 210 thus flows in series through the diluting chamber of units 126 and 128, these units comprising a diluting section, and a more concentrated solution flows in series through the diluting chambers of units 124, 122 and 120, these units comprising the concentrating section. The data of Table III demonstrate the operation of this unit to separate a solution 0.023 N in hydrochloric acid into concentrated and diluted fractions. In the units tested each concentrating and diluting chamber had a volume of 140 cu. cm. and each membrane had an exposed membrane area of 929 sq. cm. The number of chamber pairs in each stage were as follows:

| Stage | Reference No. | No. of Conc. and Diluting Chambers |
| --- | --- | --- |
| 1 | 120 | 5 |
| 2 | 122 | 10 |
| 3 | 124 | 15 |
| 4 | 126 | 45 |
| 5 | 128 | 35 |

Table III

| Stage | 1 | 2 | 3 | 4 | 5 |
| --- | --- | --- | --- | --- | --- |
| Flow rates in dil. chambers, cc./sec | 1.8 | 1.8 | 1.8 | 9.0 | 9.0 |
| Flow rates in conc. chambers, cc./sec | 2.0 | 2.0 | 2.0 | 2.0 | 2.0 |
| Concentrations, m. eq./cc.: | | | | | |
| Conc. stream influent | 0.4 | 0.17 | 0.095 | 0.017 | .0015 |
| Conc. stream effluent | 0.8 | 0.4 | 0.17 | 0.095 | 0.017 |
| Dil. stream influent | 0.8 | 0.36 | 0.10 | 0.023 | 0.005 |
| Dil. stream effluent | 0.36 | 0.10 | 0.023 | 0.005 | 0.0015 |
| Current, amps | 32 | 9 | 2 | 0.67 | 0.17 |
| Current efficiency [1] | 0.50 | 0.51 | 0.50 | 0.52 | 0.53 |

[1] By current efficiency it is meant the number of equivalents of salt that is transferred, per chamber in each cell, for each equivalent of current (96,000 amperes-seconds) passed through the chamber.

| Summary | Feed | Conc. product | Dil. product |
| --- | --- | --- | --- |
| Flow rate, cc./sec | 7.2 | 0.2 | 7.0 |
| Concentration | 0.023 | 0.8 | 0.0015 |

Power: 188 watts; or 4.5 kw. hr. per lb. of HCl in 2.9% solution
Yield: 94% in concentrated product.
Water removed: 1165 lbs. per lb. of HCl.
Power in terms of water removed: 2.1 watt hours/lb. of water.

Figure 6:
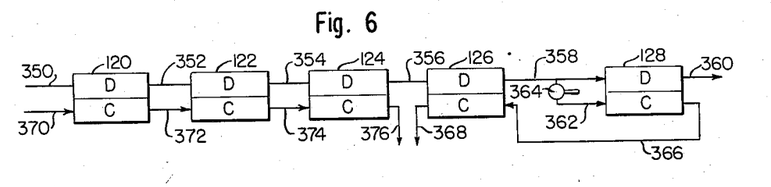
Figs. 6 and 7 show schematically alternative systems of the invention embodying several concentrating and diluting cell units.

Fig. 6 shows a modified embodiment of this invention in which one stream is passed in series through the diluting chambers of several units, and a second stream for the concentrating chambers of one or more of the cell units is divided from the first stream prior to its entry to the last unit and is passed through the concentrating chambers of the last unit, and then in the opposite order of flow through the other set of chambers of the preceding units. The solution to be diluted is flowed in series through the diluting chambers D of the several units 120, 122, 124, 126 and 128 by conduits 350, 352, 354, 358 and 360. A fraction of the solution flowing toward the last unit 128 is withdrawn from conduit 358 through a control valve 364 and conduit 362, and passed into the concentrating chambers of the last unit. From these chambers the concentrating solution is directed to the concentrating chambers C of the next preceding unit 126 by conduit 366 and discharged therefrom to waste, or for further processing, through an effluent conduit 368. A separate portion of the solution being treated is flowed through the concentrating chambers C of the remaining units 120, 122 and 124 through conduits 370, 372, 374 and 376 connecting the chambers in series. When electrical energy is supplied to the units, by means shown in Fig. 1, a dilute fraction of solution may be collected at conduit 360 discharging from the diluting chambers of the last unit 128, and concentrated fractions may be collected at conduits 376 and 368 discharging from the concentrating chambers of the third and fourth units 124 and 126.

Figure 7:
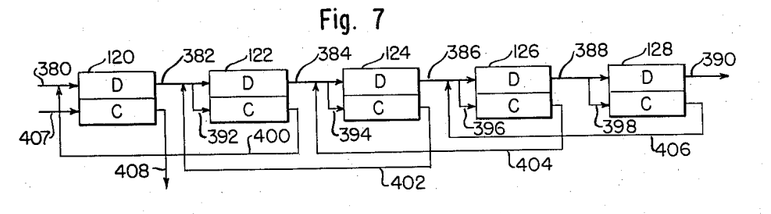

A further modification of this invention is shown in Fig. 7. The stream from the diluting chambers of each unit except the last one is divided into two fractions, one supplied to the concentrating chambers of the next unit and one to the diluting chambers. The effluent from the concentrating chambers of each unit except the first one is then mixed with the influent to the preceding unit prior to its division into concentrating and diluting streams.

In the illustrated embodiment, the solution to be treated is flowed in series through the diluting chambers D of the several units 120, 122, 124, 126 and 128 by conduits 380, 382, 384, 386, 388 and 390. A fraction of effluent diluting solution from each unit except the last one is then introduced to the concentrating chambers of the next succeeding unit through conduits 392, 394, 396 and 398 which connect with conduits 382, 384, 386 and 388 respectively, and the effluent concentrating solution from each unit except the first one is returned to the influent to the preceding unit through conduits 400, 402, 404 and 406 which connect the concentrating chambers of the last four units 122, 124, 126 and 128 respectively with the influent conduits to each unit except the last one, 380, 382, 384 and 386 respectively. Electrolyte for the concentrating chambers of the first unit 120 is supplied and withdrawn through conduits 407 and 408 respectively communicating therewith.

The electrical energy, supplied to each unit by means shown in Fig. 1, and the fractionation of the several effluent streams, are preferably adjusted so that the concentration of the effluent from the concentrating chambers of each unit except the first one equals as nearly as possible the concentration of the influent to the preceding unit, to utilize most economically the energy supplied for separation. When steady state conditions have been reached, a diluted fraction of solution supplied to the first unit 120 through conduit 380 may be collected from the diluting chambers of the last unit 128 at conduit 390, and a concentrated fraction from the concentrating chambers of the first unit may be collected at conduit 408.

Although the embodiments shown in Figs. 6 and 7 are described for operation to provide enhanced dilution, operation for enhanced concentration may be practiced simply by reversing the cell units (conveniently by switching the polarity of the electrical power connections) thereby interchanging the concentrating and diluting chambers. Under such conditions a fraction of the concentrated solution is withdrawn and passed through the diluting chambers of one or more of the cell units. In each case, whether of enhanced concentration or dilution, the effect of this invention is to minimize the concentration difference between concentrating and diluting chambers beyond that attainable by using the supply of solution to be treated as concentrating solution throughout in the case of operation for enhanced dilution, or as diluting solution throughout, in the case of operation for enhanced concentration.

Figure 8:
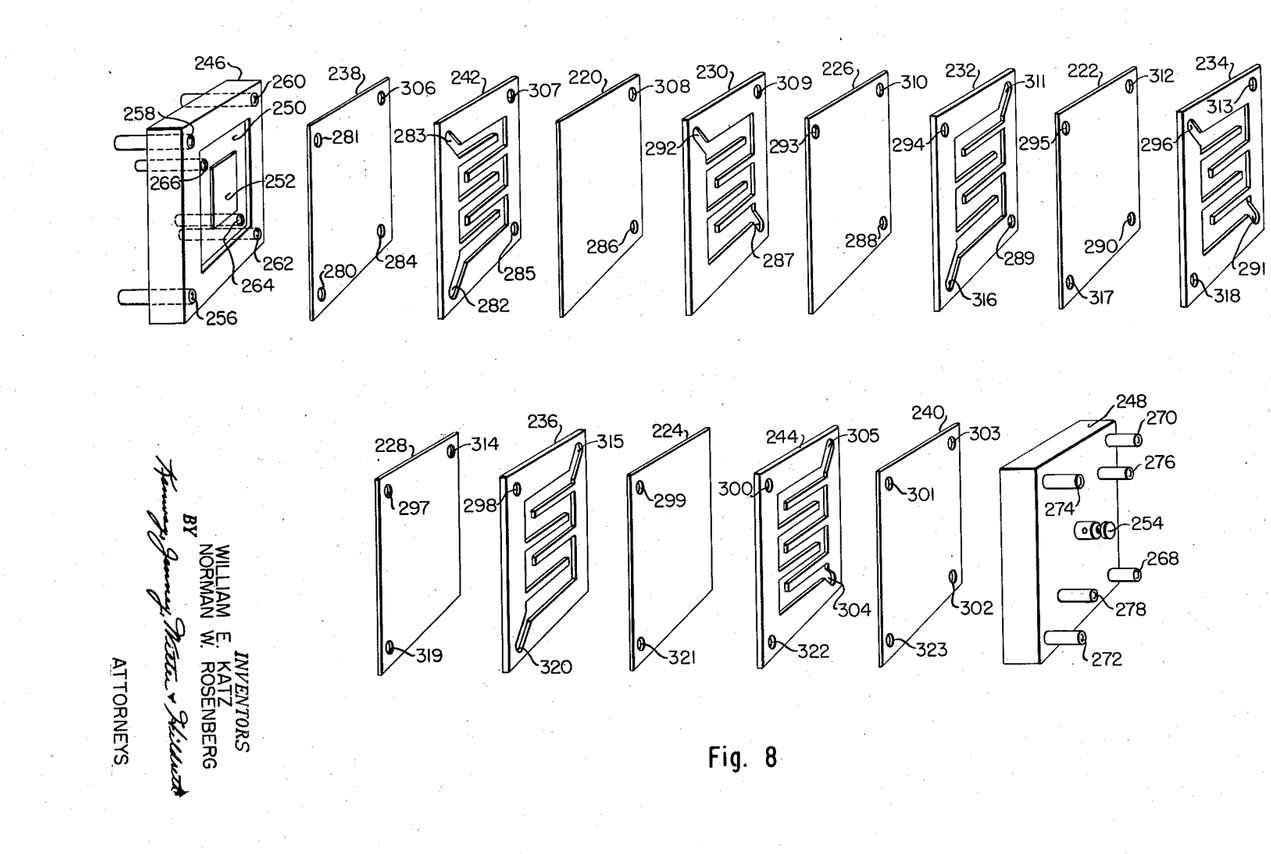
Fig. 8 is a perspective view showing the elements of a concentrating and diluting cell unit in exploded relationship.

One preferred type of construction of a concentrating and diluting unit employing alternate adjacent concentrating and diluting chambers defined between alternate anion permeable membranes and cation permeable membranes is shown in Fig. 8. The unit employs cation permeable membranes 220, 222 and 224 with anion permeable membranes 226 and 228 alternately disposed between them. Spacer members 230, 232, 234 and 236 of insulating sheet material having cut-out central regions defining the respective cell chambers are provided between adjacent membranes. Washing chambers adjacent the terminal concentrating and diluting chambers are formed between the terminal cation permeable membranes 220 and 224 and two additional cation permeable membranes 238 and 240 by spacer members 242 and 244 each having a cut-out central portion defining the chambers. The membranes and interspaced spacers are retained between header end plates 246 and 248, of insulating fabricating material, recessed at their inside surfaces to define electrode chambers 250 (shown in end plate 246). Electrodes 252 (shown in end plate 246) are situated within the electrode chambers 250 and connected electrically to terminal busses 254 (shown in end plate 248) which extend through the end plates to the outer surface and provide means for making electrical connection to the unit. The entire assembly is held in tight compressional relationship between the end plates 246 and 248 by conventional means (not shown).

Hydraulic connections to the several chambers are provided by ports in the membranes and spacers situated so that corresponding ports in adjacent membranes and spacers align to form the appropriate conduits and connections in the unit. Ducts provided in the end plates, align with the several series of ports and provide external fluid coupling means to the unit. An additional pair of fluid coupling means in the header end plates communicate with the ducts in the header end plates communicate with the electrode chambers defined therein. In the illustrated embodiment, the end plate 246 is provided with four tubular ducts 256, 258, 260 and 262 situated at each of the four corners and with two tubular ducts 264 and 266 communicating with the electrode chamber 250. End plate 248 is also provided with four similar ducts 268, 270, 272 and 274 situated at the corners, and two ducts 276 and 278 communicating with the electrode chamber. Each spacer member 242, 230, 232, 234, 236 and 244 is provided with a pair of channels leading between the central chamber region defined by the spacer and two of the conduits defined by the aligning ports in the membranes, to provide for the introduction and removal of the liquids circulated within the chambers, and with ports for channeling other liquids past the spacers. Similarly, each membrane 238, 220, 226, 222, 228, 224 and 240 is provided with ports defining channels for those liquids which are to flow past it. Connection to the washing chamber defined in spacer 242 is provided through ducts 256 and 258 in end plate 246, by aligning ports 280 and 281 in membrane 238 and aligning channels 282 and 283 in spacer 242. Parallel connection to the alternate chambers defined in spacers 230 and 234 may be made through duct 262 of end plate 246 and a channel defined by aligning ports 284, 285 and 286 (in membrane 238, spacer 242, and membrane 220 respectively) aligning channel 287 (of spacer 230), ports 288, 289 and 290 (of membrane 226, spacer 232 and membrane 222 respectively) and channel 291 (of spacer 234). An effluent passage from these chambers communicating with duct 274 of the other end plate 248 is defined by channel 292 (of spacer 230) ports 293, 294 and 295 (of membrane 226, spacer 232, and membrane 222 respectively) channel 296 (of spacer 234) and ports 297, 298, 299, 300 and 301 (of membrane 228, spacer 236, membrane 224, spacer 244, and membrane 240 respectively). Connection to the washing chamber defined in spacer 244 may be made through ducts 268 and 270 of end plate 248, aligning ports 302 and 303 of membrane 240 and aligning channels 304 and 305 of spacer 244. Fluid connection to the remaining chambers defined in spacers 232 and 236 may be made through duct 260 of end plate 246 and a channel defined by aligning ports 306, 307, 308, 309 and 310 (of membrane 238, spacer 242, membrane 220, spacer 230 and membrane 226, respectively), channel 311 (of spacer 232), ports 312, 313 and 314 (of membrane 222, spacer 234 and membrane 228 respectively) and channel 315 (of spacer 236). A passage for effluent from these chambers is formed by channel 316 (of spacer 232), ports 317, 318 and 319 (of membrane 222, spacer 234 and membrane 228 respectively), channel 320 (of spacer 236) and ports 321, 322 and 323 (of membrane 224, spacer 244 and membrane 240 respectively) and aligning duct 272 of end plate 248.

In this cell unit, chambers corresponding to the diluting chambers 10 shown in Fig. 1 are defined in spacers 230 and 234 and concentrating chambers corresponding to chambers 12 of Fig. 1 are defined in spacers 232 and 236. It will be observed that the entry and exit channels 287 and 292 in spacer 230 and the channels 291 and 296 in spacer 234 align with one set of ducts in the end plates, while the entry and exit channels 311 and 316 in spacer 232 and the channels 315 and 320 in spacer 236 align with a separate pair of ducts in the end plates. In connecting this particular concentrating and diluting unit to incorporate it in systems of the present invention, influent and effluent connections to the diluting chambers are made through tubular ducts 262 and 274 and influent and effluent connections to the concentrating chambers are made through ducts 260 and 272. Electrical connections are made through the terminal busses 254 with the left hand electrode (in end plate 246) of cathodic polarity.

In general, the selectively permeable membranes comprise ion-permeable films having fixed positive or negative charges associated with the film matrix. In addition, the films should have high electrical conductivity and high hydraulic resistivity and they should be physically and chemically resistant to the solution to be treated. Preferred membranes comprise cross-linked polymeric materials having fixed ionic constituents bound to the polymeric structure with the polymeric matrix in gel relationship with a liquid phase. The ionic components of the polymeric matrix render these materials selectively permeable to ions of the opposite charge and these materials moreover, have high electrical conductivities, generally in excess of $0.5 \times 10^{-3}$ ohm$^{-1}$ cm.$^{-1}$.

Suitable anion permeable membranes and the method of making them are described in the following copending patent applications:

Walter Juda and Wayne A. McRae, Ser. No. 103,784, filed July 9, 1949, now Patent No. 2,636,851.
Walter Juda and Andrew A. Kasper, Ser. No. 220,544, filed April 11, 1951, now Patent No. 2,731,425.
John Thacher Clarke, Ser. No. 260,080, filed December 5, 1951, now Patent No. 2,730,768.
John Thacher Clarke, Ser. No. 284,078, filed April 24, 1952, now Patent No. 2,800,445.

and suitable cation permeable membranes and methods of making them described in the following copending patent applications:

Walter Juda and Wayne A. McRae, Ser. No. 103,784, filed July 9, 1949, now Patent No. 2,636,851.
Andrew A. Kasper, Ser. No. 229,586, filed June 2, 1951, now Patent No. 2,702,272.
John Thacher Clarke, Ser. No. 260,080, filed December 5, 1951, now Patent No. 2,730,768.
John Thacher Clarke, Ser. No. 260,079, filed December 5, 1951, now Patent No. 2,731,411.
John Thacher Clarke, Ser. No. 268,242, filed January 25, 1952, now Patent No. 2,731,408.
John Thacher Clarke, Ser. No. 268,241, filed January 25, 1952, now Patent No. 2,756,202.

One preferred anion permeable membrane is prepared as follows:

| | Parts by volume |
|---|---|
| 2 vinyl pyridine (containing 0.1 percent hydroquinone) | 108 |
| Iso propanol | 120 |
| Dimethyl sulfate | 108 |
| Divinyl benzene (76 mol percent in ethyl vinyl benzene) | 81 |

The 2 vinyl pyridine was dissolved in the iso propanol and warmed to 55° C. The dimethyl sulfate was then added at a rate such that the temperature did not exceed 65° C. The mixture was cooled to room temperature and the divinyl benzene was added. The resulting liquid was then cast to form a film 150 inches long, 6 inches wide and 0.05 cm. thick on a reinforcing of glass cloth between parallel smooth casting surfaces, and heated to 80° C. for three hours while retained between the surfaces. After the membrane had cooled to room temperature it was leached in methanol, washed with water and finally equilibrated first in 1.0 N sodium chloride and then in 0.1 N sodium chloride.

A preferred cation permeable membrane is prepared as follows:

| | Parts by weight |
|---|---|
| Resorcinol | 55 |
| Phenol | 47 |
| Sulfuric acid (96%) | 103 |
| Formaldehyde (37% in water) | 131 |
| Water | 33 |

The resorcinol and phenol were melted together at a temperature of 100° C. and then cooled to 60° C. and the sulfuric acid was added. The temperature was raised to 105° C. by this addition. The sulfonated mixture was allowed to cool to 50° C. and the water was then added. The formaldehyde was cooled to −10° C. and the sulfonated mixture was added to it slowly with stirring over a period of 30 minutes while maintaining the temperature between 0 and −5° C. The liquid was cast on a reinforcing of treated cellulose battery paper between two parallel smooth casting surfaces to form a film 0.05 cm. thick, and cured for 3 hrs. at 80–85° C. After the membrane cooled it was leached repeatedly in distilled water and equilibrated in a 0.1 N sodium chloride solution.

Having thus disclosed our invention and described in detail representative and preferred embodiments thereof, we claim and desire to secure by Letters Patent:

1. The method of separating a solution containing dissolved electrolyte into concentrated and dilute fractions comprising (1) passing a first stream of solution through one set of chambers of a concentrating and diluting unit having a set of diluting chambers alternately disposed between a set of concentrating chambers, said chambers being defined between alternating anion permeable and cation permeable membranes, (2) dividing a second stream from the first stream after passage thereof through said unit, (3) passing the second stream through the other set of chambers of said unit and (4) passing a direct electric current in series across the alternating chambers and membranes, thereby to effect concentration and dilution of the streams in said unit.

2. The method of separating a solution containing dissolved electrolyte into concentrated and dilute fractions comprising (1) passing a first stream of solution for treatment in series through like chambers of a plurality of concentrating and diluting units each having concentrating chambers and diluting chambers defined between alternate anion permeable and cation permeable membranes, (2) dividing a second stream from said first stream after at least partial treatment thereof, (3) passing the second stream through the other chambers of at least one of the said concentrating and diluting units, (4) passing electrolyte streams through the other chambers of the concentrating and diluting units not supplied with the second stream and (5) passing a direct electric current in series through the alternating anion permeable and cation permeable membranes and the concentrating and diluting chambers defined between them of the several units, thereby to effect concentration and dilution of the streams in each of said units.

3. The method of separating a solution containing dissolved electrolyte into concentrated and dilute fractions comprising (1) passing a first stream of solution for treatment through like chambers of a plurality of concentrating and diluting units each having concentrating chambers and diluting chambers defined between alternate anion permeable and cation permeable membranes, (2) dividing a second stream from the first stream after at least partial treatment thereof, (3) passing the second stream through the other chambers of the terminal concentrating and diluting unit (4) passing electrolyte streams through the other chambers of the remaining concentrating and diluting units and (5) passing a direct electric current in series through the alternating anion permeable and cation permeable membranes and the concentrating and diluting chambers defined between them of the several units, thereby to effect concentration and dilution of the streams in each of said units.

4. The method of separating a solution containing dissolved electrolyte into concentrated and dilute fractions comprising (1) passing a first stream of solution for treatment through like chambers of a plurality of concentrating and diluting units each having concentrating chambers and diluting chambers defined between alternate anion permeable and cation permeable membranes, (2) dividing a second stream from the first stream after at least partial treatment thereof, (3) passing the second stream through the other chambers of the terminal concentrating and diluting unit and in series in the opposite order of flow from that of the first stream through the other chambers of at least one preceding unit (4) passing electrolyte streams through the other chambers of the remaining concentrating and diluting units and (5) passing a direct electric current in series through the alternating anion permeable and cation permeable membranes and the concentrating and diluting chambers defined between them of the several units, thereby to effect concentration and dilution of the streams in each of said units.

5. The method of separating a solution containing dissolved electrolyte into concentrated and dilute fractions comprising (1) passing a first stream of solution for treatment through like chambers of a plurality of concentrating and diluting units each having concentrating chambers and diluting chambers defined between alternate anion permeable and cation permeable membranes, (2) dividing one additional stream from said first stream after its effluent from each unit except the last, (3) passing each additional stream through the other chambers of the unit downstream from the point of division thereof from the first stream, (4) combining each additional stream with the first stream at a point upstream from the influent of the first stream to the unit preceding the point of division of the additional stream therefrom, (5) passing an electrolyte stream through the other chambers of the first unit and, (6) passing a direct electric current in series through the alternating anion permeable and cation permeable membranes and the concentrating and diluting chambers defined between them, thereby to effect concentration and dilution of the streams in each of said units.

6. The method of separating a solution containing dissolved electrolyte into concentrated and dilute fractions comprising (1) passing a first stream of solution through the diluting chambers of a concentrating and diluting unit having concentrating chambers and diluting chambers defined between alternate anion permeable and cation permeable membranes, (2) dividing a second stream from the first stream after passage thereof through the unit, (3) passing the second stream through the concentrating chambers of said unit, and (4) passing a direct electric current in series across the alternating chambers and membranes, thereby to effect concentration and dilution of the streams in said unit.

7. The method of separating a solution containing dissolved electrolyte into concentrated and dilute fractions comprising (1) passing a first stream of solution through the concentrating chambers of a concentrating and diluting unit having concentrating chambers and diluting chambers defined between alternate anion permeable and cation permeable membranes, (2) dividing a second stream from the first stream after passage thereof through the unit, (3) passing the second stream through the diluting chambers of said unit, and (4) passing a direct electric current in series across the alternating chambers and membranes, thereby to effect concentration and dilution of the streams in said unit.

8. The method of separating a solution containing dissolved electrolyte into concentrated and dilute fractions comprising (1) passing a first stream of solution in series through the diluting chambers of a plurality of concentrating and diluting units each having concentrating chambers and diluting chambers defined between alternate anion permeable and cation permeable membranes, (2) dividing a second stream from the first stream after at least partial dilution thereof, (3) passing the second stream through the concentrating chambers of at least one of the said concentrating and diluting units, (4) passing electrolyte streams through the other chambers of the concentrating and diluting units not supplied with the second stream and (5) passing a direct electric current in series through the alternating anion permeable and cation permeable membranes and the concentrating and diluting chambers defined between them of the several units, thereby to effect concentration and dilution of the streams in each of said units.

9. The method of separating a solution containing dissolved electrolyte into concentrated and dilute fractions comprising (1) passing a first stream of solution in series through the concentrating chambers of a plurality of concentrating and diluting units each having concentrating chambers and diluting chambers defined between alternate anion permeable and cation permeable membranes, (2) dividing a second stream from the first stream after at least partial concentration thereof, (3) passing the second stream through the diluting chambers of at least one of said concentrating and diluting units, (4) passing electrolyte streams through the other chambers of the concentrating and diluting units not supplied with the second stream and (5) passing a direct electric current in series through the alternating anion permeable and cation permeable membranes and the concentrating and diluting chambers defined between them of the several units, thereby to effect concentration and dilution of the streams in each of said units.

10. The method of separating a solution containing dissolved electrolyte into concentrated and dilute fractions comprising (1) passing a first stream of solution for treatment through the diluting chambers of a plurality of concentrating and diluting units each having concentrating chambers and diluting chambers defined between alternate anion permeable and cation permeable membranes, (2) dividing a second stream from the first stream after at least partial dilution thereof, (3) passing the second stream through the concentrating chambers of the terminal concentrating and diluting unit, (4) passing electrolyte streams through the concentrating chambers of the remaining concentrating and diluting units and (5) passing a direct electric current in series through the alternating anion permeable and cation permeable membranes and the concentrating and diluting chambers defined between them of the several units, thereby to effect concentration and dilution of the streams in each of said units.

11. The method of separating a solution containing dissolved electrolyte into concentrated and dilute fractions comprising (1) passing a first stream of solution for treatment through the concentrating chambers of a plurality of concentrating and diluting units each having concentrating chambers and diluting chambers defined between alternate anion permeable and cation permeable membranes, (2) dividing a second stream from the first stream after at least partial concentration thereof, (3) passing the second stream through the diluting chambers of the terminal concentrating and diluting unit, (4) passing electrolyte streams through the diluting chambers of the remaining concentrating and diluting units and (5) passing a direct electric current in series through the alternating anion permeable and cation permeable membranes and the concentrating and diluting chambers defined between them of the several units, thereby to effect concentration and dilution of the streams in each of said units.

12. The method of separating a solution containing dissolved electrolyte into concentrated and dilute fractions comprising (1) passing a first stream of solution for treatment through the diluting chambers of a plurality of concentrating and diluting units each having concentrating chambers and diluting chambers defined between alternate anion permeable and cation permeable membranes, (2) dividing a second stream from the first stream after at least partial dilution thereof, (3) passing the second stream through the concentrating chambers of the terminal concentrating and diluting unit, and in series in the opposite order of flow from that of the first stream through the concentrating chambers of one or more preceding units, (4) passing electrolyte streams through the concentrating chambers of the remaining concentrating and diluting units and (5) passing a direct electric current in series through the alternating anion permeable and cation permeable membranes and the concentrating and diluting chambers defined between them of the several units, thereby to effect concentration and dilution of the streams in each of said units.

13. The method of separating a solution containing dissolved electrolyte into concentrated and dilute fractions comprising (1) passing a first stream of solution for treatment through the concentrating chambers of a plurality of concentrating and diluting units each having concentrating chambers and diluting chambers defined between alternate anion permeable and cation permeable membranes, (2) dividing a second stream from the first stream after at least partial concentration thereof, (3) passing the second stream through the diluting chambers of the terminal concentrating and diluting unit and in series in the opposite order of flow from that of the first stream through the diluting chambers of one or more preceding units, (4) passing electrolyte streams through the concentrating chambers of the remaining concentrating and diluting units and (5) passing a direct electric current in series through the alternating anion permeable and cation permeable membranes and the concentrating and diluting chambers defined between them of the several units, thereby to effect concentration and dilution of the streams in each of said units.

14. The method of separating a solution containing dissolved electrolyte into concentrated and dilute fractions comprising (1) passing a first stream of solution for treatment through the diluting chambers of a plurality of concentrating and diluting units each having concentrating chambers and diluting chambers defined between alternate anion permeable and cation permeable membranes, (2) dividing one additional stream from said first stream after its effluent from each unit except the last, (3) passing each additional stream through the concentrating chambers of the unit downstream from the point of division thereof from the first stream, (4) combining each additional stream with the first stream at a point upstream from the influent of the first stream to the unit preceding the point of division of the additional stream therefrom, (5) passing an electrolyte stream through the concentrating chambers of the first unit and (6) passing a direct electric current in series through the alternating anion permeable and cation permeable membranes and the concentrating and diluting chambers defined between them, thereby to effect concentration and dilution of the streams in each of said units.

15. The method of separating a solution containing dissolved electrolyte into concentrated and dilute fractions comprising (1) passing a first stream of solution for treatment through the concentrating chambers of a plurality of concentrating and diluting units each having concentrating chambers and diluting chambers defined between alternate anion permeable and cation permeable membranes, (2) dividing one additional stream from said first stream after its effluent from each unit except the last, (3) passing each additional stream through the diluting chambers of the unit downstream from the point of division thereof from the first stream, (4) combining each additional stream with the first stream at a point upstream from the influent of the first stream to the unit preceding the point of division of the additional stream therefrom, (5) passing an electrolyte stream through the diluting chambers of the first unit and (6) passing a direct electric current in series through the alternating anion permeable and cation permeable membranes and the concentrating and diluting chambers defined between them, thereby to effect concentration and dilution of the streams in each of said units.

16. The method of separating a solution containing dissolved electrolyte into concentrated and dilute fractions comprising flowing a first stream of electrolyte in series through the diluting chambers of a plurality of concentrating and diluting units each having concentrating chambers and diluting chambers defined between alternate anion permeable and cation permeable membranes, dividing said first stream after dilution thereof into a dilute product stream and a second stream and flowing the second stream in series in the opposite order of flow through the concentrating chambers of the several units, dividing said second stream after concentration thereof into a concentrated product stream and a third stream, combining the third stream with the first stream for flow through the diluting chambers of the several units, introducing an electrolytic feed stream of the character of the first stream at a mid point in the flow path through the units, and passing a direct electric current in series through the alternating anion permeable and cation permeable membranes and the concentrating and diluting chambers defined between them thereby to effect concentration and dilution of the streams in each of said units.

17. Apparatus for separating solutions containing dissolved electrolyte into concentrated and dilute fractions comprising: a plurality of concentrating and diluting units each having a set of concentrating chambers and a set of diluting chambers defined between alternate anion permeable and cation permeable membranes and means for passing a direct electric current in series through said membranes and chambers defined between them; conduit means for flowing a first stream of solution for treatment in series through like sets of chambers of the several units; conduit means for withdrawing a fraction of said solution after at least partial treatment thereof and passing said fraction through the other set of chambers of at least one other of the concentrating and diluting units; and means for passing an electrolyte through the other sets of chambers of the units not supplied with said fraction.

18. Apparatus for separating solutions containing dissolved electrolyte into concentrated and dilute fractions comprising: a plurality of concentrating and diluting units each having a set of concentrating chambers and a set of diluting chambers defined between alternate anion permeable and cation permeable membranes and means for passing a direct electric current in series through said membranes and chambers defined between them; means for flowing a first stream of solution for treatment in series through the diluting chambers of the several units; means for withdrawing a fraction of said solution after at least partial dilution thereof and passing said fraction through the concentrating chambers of at least one other of the concentrating and diluting units; and means for passing an electrolyte through the concentrating chambers of the units not supplied with said fraction.

19. Apparatus for separating solutions containing dissolved electrolyte into concentrated and dilute fractions comprising: a plurality of concentrating and diluting units each having a set of concentrating chambers and a set of diluting chambers defined between alternate anion permeable and cation permeable membranes and means for passing a direct electric current in series through said membranes and chambers defined between them; means for flowing a first stream of solution for treatment in series through the concentrating chambers of the several units; means for withdrawing a fraction of said solution after at least partial concentration thereof and passing said fraction through the diluting chambers of at least one other of the concentrating and diluting units; and means for passing an electrolyte through the diluting chambers of the units not supplied with said fraction.

References Cited in the file of this patent

UNITED STATES PATENTS 1,986,920    Cross _________________ Jan. 8, 1935

FOREIGN PATENTS 689,674    France ________________ June 2, 1930

OTHER REFERENCES

"Helvetica Chimica Acta," vol. 23 (1940), pages 795–800, article by Meyer et al.